UNITED STATES PATENT OFFICE 2,682,553

OXIDATION OF HYDROCARBONS

James C. Kirk and Edwin R. Baker, Ponca City, Okla., assignors to Continental Oil Company, Ponca City, Okla., a corporation of Delaware No Drawing. Application February 27, 1951,
Serial No. 213,056

12 Claims. (Cl. 260—451)

This invention is concerned with the autoxidation of petroleum hydrocarbons to yield useful organic oxygen compounds. Specifically it provides an improved process of oxidizing relatively high molecular weight hydrocarbons such as paraffin wax and related materials to produce fatty acids capable of use as intermediates in the manufacture of greases, detergents, wetting agents, lubricating oil additives, and in other fields.

The art of oxidizing paraffin hydrocarbons is extremely old and many prior art workers have investigated a wide variety of methods. Ordinarily a catalyst or mixture of catalysts has been employed while bubbling air through the mass to be oxidized. Even with the best catalysts yet tried, for example, $KMnO_4$ with added promoters, an induction period of from one to three hours has always been encountered. In certain cases this induction period has been shortened by a preliminary higher temperature oxidation, but in no case, within our knowledge, has it been eliminated.

It is a principal object of this invention to provide a process of autoxidation of paraffins at moderate temperatures without the usual induction period. As will be described below, utilization of a certain catalyst composition results in the reaction proceeding immediately in a strongly exothermic manner thus making the process much more useful practically.

A second objection to the prior art processes has been the difficulty of controlling the oxidation process so as to produce the highest preponderance of useful products. Normally in any autoxidation process the end products will include aldehydes, ketones, alcohols, fatty acids, hydroxy acids, lactones, estolides, and other oxygenated materials. Obviously for many uses of the end product of the oxidation process, certain of these are less desirable than others, and particularly when the end product is to be used as a fatty acid, an end product containing the highest possible proportion of fatty acids is desired. In particular when the end product is to be used as an intermediate in the manufacture of grease and detergents, it is especially desirable that the hydroxy acid content of the oxidized end product be kept to a minimum. Prior methods of oxidation have not succeeded in producing materials sufficiently high in fatty acids and sufficiently low in hydroxy acids to make possible their use commercially without expensive fractionation or other separation processing.

It is a further object, therefore, of this invention to provide an autoxidation process which will yield an immediate end product of such character that it can be used directly for grease-making or allied purposes.

Other objects and advantages will appear as the description of the invention proceeds.

To the accomplishment of the foregoing and related ends, this invention, then, comprises the features hereinafter fully described and particularly pointed out in the claims, the following description setting forth in detail certain ways in which the invention may be carried out, these being indicative, however, of but a few of the various ways in which the principle of the invention may be employed.

Broadly stated, this invention provides a process for the oxidation of hydrocarbons to form organic oxygen compounds which comprises the steps of maintaining a liquid phase of the hydrocarbon to be oxidized, incorporating in such liquid phase minor amounts of both a polyvalent metal salt which is soluble in said liquid phase and manganese dioxide, and forming a reaction mass by passing through said liquid phase a stream of an oxygen-containing gas, said reaction mass being substantially free of naturally-occurring fatty material.

In the further and more particular description of the process which comprises this invention, it will be convenient to explain in detail sequentially the various features of and materials used in such process as thus broadly defined above.

THE HYDROCARBONS TO BE OXIDIZED

The hydrocarbons which may be oxidized by the process of this invention may be any of the relatively high molecular weight non-benzenoid hydrocarbons such as those which contain at least about sixteen carbon atoms in the molecule. Since it is one of the principle objects of this invention to provide low cost organic oxygen compounds such as fatty acids, low cost and plentiful petroleum hydrocarbons will be found of greatest utility. The following is a partial list of specific examples which will be found useful:

*Table I*

Mineral oil (paraffin or naphthenic)
Petrolatum
Paraffin wax and blends
Foots oil As previously indicated, the process of this invention is carried out while the hydrocarbon to be oxidized is in the liquid phase. Since the process is usually carried out at an elevated temperature, most of the useful starting materials will be liquid at the temperatures used. When relatively low temperatures of oxidation are desired, as is sometimes the case for particular product control, or when the starting material is of quite high molecular weight a total or partial solvent which is inert to the conditions of the reaction mass may be used.

THE MANGANESE DIOXIDE CATALYST

This new process consists in employing as catalyst a previously prepared manganese dioxide, preferably of colloidal size, together with an acid-promoter such as a polyvalent metal organic salt.

Other previous processes have employed naturally occurring fatty materials such as tallow, tallow fatty acids, and the like, together with $KMnO_4$. When, however, manganese dioxide is used in combination with an acid promoter such as polyvalent metal organic salt, it is found that such added fatty matter is definitely deleterious and better results are achieved without it.

It has been discovered that the microscopically minute particles of manganese dioxide immediately catalyze the oxidation of paraffin hydrocarbons so that no induction period can be detected, and that the metal salt promotes preferentially the formation of carboxylic acids. Since the reaction initiates itself at once and proceeds rapidly, it is possible to employ lower temperatures than have previously been found necessary for adequate yields in sufficiently short times. These lower temperatures then result in substantially reduced quantities of hydroxy acids in the final products. Thus, all of the stated objects are achieved.

Although manganese dioxide has been employed previously as oxidation catalyst (however not in combination with an oil-soluble polyvalent metal salt), it has not heretofore been recognized that particle size is capable of playing such an important role in the initiation of these reactions. Following an observation that the brown color of this catalyst disappears as oxidation proceeds, it was conceived that use of the manganese dioxide in microscopic form might prove of great advantage and experimentation has confirmed this.

While it is possible to purchase manganese dioxide, as such, on the market, best results will be secured if the material as purchased is screened or otherwise classified to reject the coarse particles and even better results will be secured if the microscopic manganese dioxide is prepared in any of the ways given below and especially if the thus produced microscopic material is used while it is still fresh, i. e., before it has had an opportunity to age for more than a week.

EXAMPLE I.—PREPARATION OF MANGANESE DIOXIDE INORGANICALLY

Colloidal manganese dioxide was prepared by the method of Joshi and Naragon, C. A. 25, 2346 (1931). Concentrated ammonia was added dropwise to a well stirred boiling solution of 30 g. potassium permanganate in 500 ml. of water until the purple color was discharged. The brown precipitate of manganese dioxide then was filtered off, washed and dried at 110° C. The resulting very dark brown powder was examined under a compound microscope and found to consist of very uniform spheroids of approximately 0.3 micron in diameter. Analysis gave an assay of 69% $MnO_2$, the balance being water of hydration.

EXAMPLE II.—PREPARATION OF MANGANESE DIOXIDE ORGANICALLY

A solution of 0.4 g. of $KMnO_4$ in 7 ml. water was added dropwise to a boiling solution of 0.23 g. sodium oleate in 7 ml. of water with good stirring. After the purple color had discharged, a heavy gel of sodium dihydroxystearate was formed through which was dispersed manganese dioxide. The gel was then filtered off and thoroughly washed. This gel was used as such in a subsequent example. To obtain free manganese dioxide, another batch of this gel was prepared and then it was treated with dilute nitric acid to break up the sodium salt. The resulting mass was washed with water and then ether until the residue was free of organic matter. This manganese dioxide was dried and also examined under the microscope. Particle size and shapes were essentially the same as in Example I.

The manganese dioxide used may be prepared as shown in the examples above or by any other method as described in the literature, as for example in Patent 1,602,404, or in Mellor, "Comprehensive Treatise of Inorganic and Theoretical Chemistry," vol. XII, for example on page 262 (1947).

The range of concentrations useful is from 0.01% to 0.5% in the weight of hydrocarbon charge, with a range of 0.02% to 0.1% being preferable.

The particle size of the manganese dioxide is preferably less than 80 microns in diameter with best results accruing from the use of sizes less than about 1 micron.

THE ACID PROMOTERS (POLYVALENT METAL SALTS)

This promoter, for use with the manganese dioxide, is an organic salt of a polyvalent metal. A wide variety of metal salts are effective. They must be soluble in the reaction mass to be useful. Choice as between the metal salts to be employed will depend on the desired products.

The range of concentrations useful for the acid-promoter is from 0.1% to 2% with from 0.25%–1% preferred.

The promoter may be more specifically defined by having reference first, to the acids from which the salts may be produced and then the metals which may be used in the production of such salts.

The organic acids from which such promoter salts may be derived should be soluble in the reaction mass. Any organic acid yielding such a soluble salt will be found useful. Specific examples of useful acids are listed in the following table.

*Table II*

Stearic acid
Oleic acid
Naphthenic acids
Wax acids from this process

It will be observed that in general long chain fatty acids having at least twelve carbon atoms in the chain will generally yield salts (if the proper metal is selected) which give best results.

Any of the polyvalent metals whose organic salts are sufficiently soluble in the reaction mass may be used in the preparation of the polyvalent metal salts used as the acid promoter. Those polyvalent metals whose atomic weight is at least 30 are preferred. Examples of useful metals are given in the following table:

Table III

| | |
|---|---|
| Cadmium | Lead |
| Manganese | Nickel |
| Cobalt | Chromium |
| Zinc | Calcium |
| Barium | |

In the following table will be found listed a number of specific examples of salts which will be found particularly useful as acid promoters in the process of this invention:

Table IV

Zinc stearate
Calcium naphthenate
Cobalt naphthenate
Barium naphthenate
Lead naphthenate

THE OXIDATION PROCESS

The actual oxidation of the hydrocarbon raw material may be effected in any convenient form of apparatus which should preferably be lined with a corrosion resistant material such as enamel, glass, stainless steel, aluminum, etc. The reaction vessel should preferably be a relatively slender vertical column provided with means for introducing the oxygen-containing gas such as air, in a finely divided stream at or near the bottom of the vessel. The vessel should be provided with efficient mechanical agitation means, a reflux condenser, and the usual connections for introduction and withdrawal of materials.

The reaction vessel should be provided with heat exchange means such as a jacket or internal coils whereby the temperature of the reaction mass may be raised to the desired point as the reaction is initiated and whereby the mass may be cooled to control the temperature thereof as the exothermic reaction of oxidation progresses.

The temperature should be maintained at the lowest value consistent with carrying out the reaction at practicable rates. It has been found that a range of 110° C. to 160° C. is suitable, although higher temperatures not to exceed 200° C. may be used for special purposes. The preferred range is 125–140° C. Constancy of a selected temperature has been found necessary to prepare uniform and reproducible products. The variation at a given temperature should not exceed 2–5° C.

The air or other oxygen-containing gas has no restrictions on its composition although enrichment of air by oxygen will of course speed the reaction. It is preferable to use dry air if feasible as water has been found to retard the oxidation. The gas should be introduced in a finely divided state and agitation should be as violent as is practicable since both conditions lead to more rapid reactions.

The catalyst-promoter mixture may be added as one portion at the start of the reaction or in several portions during its course to maintain optimum rates.

Yields have been found to approach 100% recovery by weight of the starting hydrocarbon charge. Thus, the loss of volatile low molecular weight products is balanced by the increase in oxygen content of the non-volatile reaction products.

Subsequent treating of the oxidation product, such as water-washing, filtration, treatment with other oxidizing or reducing agents, may be desirable to clarify, refine or otherwise stabilize the product. Normally it is not necessary to saponify and separate the unsaponifiable matter nor to distill the product to obtain a raw material useful as an intermediate in the manufacture of greases, soaps, etc.

EXAMPLE III.—OXIDATION OF PARAFFIN SCALE WAX—M. P. 125–127° F.

A series of oxidation tests were made wherein 400 grams of scale wax were melted and placed in a flask equipped with stirrer, cooling fan, and heating mantle, thermostatic control, thermometer, fritted glass air inlet tube, and condenser to receive volatile products. The temperature was brought to 135° C. and the quantities of catalyst shown in the following table were then added and the stirrer started and room air introduced at the rate shown. In the case of those runs illustrative of this invention (runs 4, 7, and 9), an immediate exothermic reaction commenced as shown by the operation of the switch starting up the cooling fan, the rise in temperature (2–5° C.), and the odor produced in the exit gases. The reaction was continued for seven hours. Samples then were taken and acid numbers and saponification numbers run by standard American Oil Chemists Society Methods 5d3-25, Ca5A-40, wherein both are expressed as mg. KOH/gram sample. Results are shown in the following table:

Table V

[Scale wax—oxidized 7 hr. at 135° C.—air rate 6.4 l/min.]

| Run No. | Catalyst Used | Acid No. | Sap. No. | Ratio Sap. No. / Acid No. |
|---|---|---|---|---|
| 1 | Control, no catalyst | 3.3 | 10.1 | 3.1 |
| 2 | 0.03% MnO$_2$ prepared by Example I. | 32 | 52 | 1.6 |
| 3 | 0.5% Zinc Stearate | 30 | 61 | 2.0 |
| 4 | 0.03% MnO$_2$ prepared by Example I. <br> 0.50% Zinc Stearate | 97 | 184 | 1.9 |
| 5 | 0.03% MnO$_2$ (J. T. Baker CP grade). <br> 0.50% Zinc Stearate | 51 | 90 | 1.7 |
| 6 | 0.03% MnO$_2$+300 mesh (J. T. Baker CP grade). <br> 0.5% Zinc Stearate | 44 | 72 | 1.6 |
| 7 | 0.03% MnO$_2$—300 mesh (J. T. Baker CP grade). <br> 0.5% Zinc Sterate | 61 | 102 | 1.7 |
| 8 | 0.03% MnO$_2$ contained in gel prepared as in Example II. <br> 0.5% Zinc Stearate | 76 | 151 | 2.0 |
| 9 | 0.03% MnO$_2$ prepared as in Example II, HNO$_3$ treated. <br> 0.5% Zinc Stearate | 99 | 191 | 1.9 |
| 10 | 0.03% MnO$_2$ prepared as in Example I. <br> 0.11% Sodium Oleate <br> 0.5% Zinc Stearate | 81 | 173 | 2.1 |
| 11 | 0.03% MnO$_2$ prepared as in Example I. <br> 5% Lube-base (Fatty acid mixture Iodine No. 68, M. p. 110° F.). <br> 0.5% Zinc Stearate | 62 | 128 | 2.1 |

The data in the above table illustrate the following points:

(a) The use of the combined catalyst (run 4) gives very much better results than either constituent alone (runs 2 and 3).

(b) Physical character of the manganese dioxide is extremely important (runs 4, 7, and 9 compared to runs 5, 6, and 8).

(c) Run 11, which is similar to run 4 except that it contained a minor amount of added fatty material, has been included to demonstrate the deleterious effect of such fatty material.

The finer the particle size the faster is the reaction. It must be free of organic reduction agent and products.

EXAMPLE IV.—OXIDATION OF SCALE WAX USING VARIOUS METAL SALTS

A series of oxidations were conducted under precisely the same conditions as employed in Example III except that the organic polyvalent metal salts employed with manganese dioxide were varied; controls in the absence of manganese dioxide were also made. Results are shown in the following table:

*Table VI*

[Scale wax—oxidized 7 hrs. at 135° C.—air rate 6.4 l./min.]

| Run No. | Catalyst Used | Acid No. | Sap. No. | Ratio Sap. No. / Acid No. |
|---|---|---|---|---|
| 4 | 0.03% $MnO_2$ / 0.5% Zinc Stearate | 97 | 184 | 1.9 |
| 12a | 0.33% Calcium Naphthenate alone | 25 | 43 | 1.7 |
| 12b | Same plus 0.03% $MnO_2$ | 37 | 56 | 1.5 |
| 13a | 0.41% Barium Naphthenate alone | 16 | 31 | 1.9 |
| 13b | Same plus 0.03% $MnO_2$ | 51 | 91 | 1.8 |
| 14a | 0.35% Cobalt Naphthenate alone | 30 | 84 | 2.8 |
| 14b | Same plus 0.03% $MnO_2$ | 67 | 159 | 2.4 |
| 15a | 0.68% Lead Naphthenate | 66 | 110 | 1.7 |
| 15b | Same plus 0.03% $MnO_2$ | 85 | 171 | 2.0 |
| 16a | 0.56% Manganese Naphthenate | 57 | 160 | 2.8 |
| 16b | Same plus 0.03% $MnO_2$ | 80 | 143 | 1.8 |

$MnO_2$ used above was prepared as in Example I.
Metals salts were used in amounts to give the same molecular equivalents of metals throughout the above series of runs.

The above data illustrate the wide variety of metal salts which may be used as acid-forming promoters when combined with catalyst manganese dioxide.

It will be noted in both Tables V and VI that the ratio of saponification number to acid number has been given. This ratio is a direct measure of the relative proportions of esterified fatty acids to free fatty acids. Indirectly thus it is also a measure of the quantity of hydroxyl compounds present since esters are reaction products of hydroxy organic materials and fatty acids. It is of particular interest to note that the ratio may be varied by choice of catalyst combination to give a low or a high ratio. Normally, as indicated previously, it is desirable to keep this ratio low to avoid hydroxy acids which are less satisfactory in most end uses.

EXAMPLE V.—VARIATION OF REACTION TEMPERATURES AND RAW MATERIALS

A series of reactions similar to Example I were carried out in which the starting raw materials were varied as well as the temperatures of reaction. The following table shows results from this series:

*Table VII.—Variation of raw materials and temperatures*

[7 hr. 6.4 l. air/min.]

| Run No. | Raw Material | Temperature, °C. | Acid No. | Sap. No. |
|---|---|---|---|---|
| 18 | 400 Petrolatum a | 135 | 63 (6 hr.) | 138 (6 hr.). |
| 19 | 600 Petrolatum a | 135 | 74 | 165. |
| 20 | 800 Petrolatum a | 135 | 56 | 137. |
| 21 | Decahydronaphthalene b | 135 | 19 | 44. |
| 22 | 400 Pale Oil a | 135 | 37 | 95. |
| 23 | 400 Petrolatum a | 145 | 55 (6 hr.) | 135 (6 hr.). |
| 24 | do. a | 125 | 60 (12 hr.) | 134 (12 hr.). |
| 25 | do. c | 120 | 52 (14 hr.) | 119 (14 hr.). | a Catalyst used same as in run 8.
b Catalyst used same as in run 4.
c Catalyst used same as in run 8 but in double quantity.
400 petrolatum, M. P. 130° F., is a solid product prepared by dewaxing a waxy Mid-Continent distillate to yield 400 pale oil.
600 petrolatum, M. P. 133° F., is a solid product prepared by dewaxing a waxy Mid-Continent distillate to yield 600 pale oil.
800 petrolatum, M. P. 144° F., is a solid product prepared by dewaxing a waxy Mid-Continent distillate to yield 800 pale oil.
400 pale oil is a commercial Mid-Continent lubricating oil fraction.

Points of interest in the above table are the wide variety of petroleum products which may be used as starting material and the variation possible in temperature.

In order to illustrate the advantages to be gained by the use of the preferred catalyst mixture in making possible the use of low temperatures, the following table sumarizes the yield in fatty acid and hydroxy acid content at various temperatures. As is seen, the lower temperatures give similar yield but appreciably lower hydroxy acid percentages which permits the use of the oxidized product without prolonged and expensive purification steps.

*Table VIII.—Effect of temperature on hydroxy acid content*

| Run No. | Temperature, °C. | Separated Fatty Acids | | | |
|---|---|---|---|---|---|
| | | Percent | Acid No. | Percent OH | Percent Hydroxy Acids |
| 26 | 120 | 41 | 150 | 1.72 | 38 |
| 27 | 125 | 43 | 151 | 1.75 | 39 |
| 28 | 135 | 44 | 156 | 2.02 | 43 |
| 29 | 145 | 52 | 157 | 2.41 | 51 |

Raw material used in above runs—400 petrolatum.
Catalyst used as prepared in Example II plus 0.5% zinc stearate.
Percent OH determined by procedure given in Siggia, Quant. Org. Anal. (1949), page 4.
Hydroxy acids calculated assuming one hydroxy group per acid molecule.

EXAMPLE VI.—PREPARATION OF GREASE FROM OXIDIZED PRODUCT

The oxidation product prepared by a reaction similar to run 24 in Example V was used to prepare two varieties of grease in the following manner. The base oil used was a 50 V. I. 200 Coastal naphthenic oil.

The following runs are illustrative of pilot plant size batches:

*Run No. 30.*—In this run, the starting material was a white paraffin scale wax having a melting point of about 52° C. A total of about 21 pounds of such wax was placed in a kettle and to it was added 95.2 g. of zinc stearate and 7.5 g. of manganese dioxide prepared as in Example I above. Oxidation was carried on at a temperature of 135° C. for a period of 6 hours while vigorously agitated. The reaction mass was air blown at a rate of 3.3 cu. ft./min. The air used was substantially dry. At the end of 6 hours, the product had an acid number of 77, a saponification number of 160, and a saponification-acid ratio of 2.1. The entire product, at the end of the oxidation period, was a semi-solid, pasty mass, straw-colored, which on standing tended to bleed or separate out minor quantities of liquid.

*Run No. 31.*—In this run, the same equipment, quantities of catalyst, quantities of raw material, and rate of air blowing were employed as in run No. 30, excepting that the starting material in this case was 400 petrolatum, having a melting point of about 130° F. which is a substantially solid product prepared by dewaxing a waxy Mid-Continent distillate in the production of 400 pale oil. Air blowing was for a period of 6½ hours, at which time the product had an acid number of 81, a saponification number of 170, and a saponification-acid ratio of 2.1. The product in its general appearance was similar to the product of run No. 30. Runs Nos. 30 and 31 are notable as compared to the runs previously given in that a substantially higher concentration of catalyst was used, it being noted, however, that the ratio of amount of manganese dioxide to the fatty acid soap was substantially the same. In this connection, it should be pointed out that a preferred total amount of catalyst is about one per cent and a preferred ratio between the amount of manganese dioxide and fatty acid soap used is about 1 to 10.

SODIUM GREASE

Thirteen and one-half pounds of the oxidation product were added to 15 pounds of base oil in a small grease kettle. The temperature was raised to 160° F. To this was added 1 pound 4 ounces commercial flake caustic soda as a 40% aqueous solution. Cooking was started while stirring constantly, and the temperature was raised to 220° F. over a period of 1 hour and dehydration and saponification carried out at this temperature. Free alkalinity at this point was determined as 0.18% NaOH. The temperature was then raised with continuous agitation to 290° F. in approximately 30 minutes. Base oil was then added in portions while maintaining temperatures above 250° F. until samples showed proper penetrations. These samples tested as follows:

| Sample No. | Percentage Soap Base | Penetration, Worked |
|---|---|---|
| 1 | 24 | 230 |
| 2 | 19 | |
| 3 | 15.7 | 285 |
| 4 | 13.5 | |
| 5 | 11.6 | 315 |

The heat was then turned off and the temperature allowed to drop to 160° F. at which time the product was removed. The resulting grease, (11.6% soap) was smooth, unctuous, of light color and bright. Melting point was 388° F. and free alkalinity less than 0.03% NaOH. Storage stability of this grease is satisfactory.

CALCIUM GREASE

This grease was made in a laboratory-sized kettle. Materials used were the same base oil as above, and the oxidized product was run 23.

Five hundred sixty-seven grams oxidized product were added to 632 grams of base oil in small grease kettle. The temperature was raised to 200° F. and agitation started. Then 50 grams of commercial hydrated lime were added gradually as an aqueous suspension in 100 grams of water. The heat was then continued and the temperature raised to 270° F. Additional base oil was then added in portions and samples removed for tests.

| Sample No. | Percent Soap Base | Worked Penetration |
|---|---|---|
| 1 | 21 | 305 |
| 2 | 15 | 390 |

The kettle contents were cooled to 150° F. and the contents removed. The resulting grease (15% soap base) was smooth, bright, and non-fibrous.

In connection with the above greases, it has been found that all the usual addition agents or fillers to improve tackiness, stringiness, oxidation stability, unctuousness or to impart extreme pressure characteristics may be used therein. In addition, lithium, aluminum, barium, as well as mixed bases may be employed to produce greases for specialized purposes.

For the manufacture of greases formed of the soaps of certain metals and when certain particular properties of the finished grease are desired, it will be found advantageous to employ the synthetic fatty acids produced by our process in combination with naturally occurring fatty acids.

Other modes of applying the principles of the invention may be employed, change being made as regards the details described, provided the features stated in any of the following claims or the equivalent of such be employed.

We, therefore, particularly point out and distinctly claim as our invention:

1. A process for the oxidation of hydrocarbons to form organic oxygen compounds, comprising the steps of maintaining a liquid phase of the hydrocarbon to be oxidized, incorporating in such liquid phase minor amounts of both a polyvalent metal salt of a carboxylic acid selected from the group consisting of long chain fatty acids having at least twelve carbon atoms and naphthenic acids soluble in said liquid phase and a manganese dioxide catalyst consisting of particles less than 80 microns in diameter, and forming a reaction mass by passing through said liquid phase a stream of an oxygen containing gas, said reaction mass being substantially anhydrous and free of naturally occurring fatty material.

2. A process for the oxidation of non-benzenoid hydrocarbons of at least 16 carbon atoms to form organic oxygen compounds, comprising the steps of maintaining a liquid phase of the hydrocarbon to be oxidized, incorporating in such liquid phase minor amounts of both a polyvalent metal salt of a carboxylic acid selected from the group consisting of long chain fatty acids having at least twelve carbon atoms and naphthenic acids soluble in said liquid phase, which metal has an atomic weight of at least 30, and a manganese dioxide catalyst consisting of particles less than 80 microns in diameter, and forming a reaction mass by passing through said liquid phase a stream of an oxygen containing gas, said reaction mass being substantially anhydrous and free of naturally occurring fatty material.

3. A process for the oxidation of paraffin hydrocarbons to form organic oxygen compounds, comprising the steps of maintaining a liquid phase of the hydrocarbon to be oxidized, incorporating in such liquid phase minor amounts of both a polyvalent metal salt of a carboxylic acid selected from the group consisting of long chain fatty acids having at least twelve carbon atoms and naphthenic acids soluble in said liquid phase and a manganese dioxide catalyst consisting of particles less than 80 microns in diameter, and forming a reaction mass by passing through said liquid phase a stream of an oxygen containing gas, said reaction mass being substantially anhydrous and free of naturally occurring fatty material.

4. A process for the oxidation of a naphthenic hydrocarbon to form organic oxygen compounds, comprising the steps of maintaining a liquid phase of the hydrocarbon to be oxidized, incorporating in such liquid phase minor amounts of both a polyvalent metal salt of a carboxylic acid selected from the group consisting of long chain fatty acids having at least twelve carbon atoms and naphthenic acids soluble in said liquid phase and a manganese dioxide catalyst consisting of particles less than 80 microns in diameter, and forming a reaction mass by passing through said liquid phase a stream of an oxygen containing gas, said reaction mass being substantially anhydrous and free of naturally occurring fatty material.

5. A process for the oxidation of normally solid paraffin hydrocarbons to form organic oxygen compounds, comprising the steps of maintaining said hydrocarbon at a temperature sufficient to convert the hydrocarbon to the liquid state but not substantially in excess of about 200° C., incorporating in the liquid mass thus formed a minor amount, not substantially in excess of about 2 per cent, of a polyvalent metal salt of a carboxylic acid selected from the group consisting of long chain fatty acids having at least twelve carbon atoms and naphthenic acids soluble in said liquid mass and a catalytic amount of a manganese dioxide catalyst consisting of particles less than 80 microns in diameter, and forming a reacting mass by passing through such liquid mass, at atmospheric pressure, a stream of an oxygen-containing gas, said reaction mass being substantially anhydrous and free of added naturally occurring fatty material.

6. A process for the oxidation of normally solid paraffin hydrocarbons to form organic oxygen compounds, comprising the steps of maintaining said hydrocarbon at a temperature sufficient to convert the hydrocarbon to the liquid state but not substantially in excess of about 200° C., incorporating in the liquid mass thus formed a minor amount, not substantially in excess of about 2 per cent, of a polyvalent metal salt of a carboxylic acid selected from the group consisting of long chain fatty acids having at least twelve carbon atoms and naphthenic acids soluble in said liquid mass and a catalytic amount of a manganese dioxide catalyst consisting of particles less than 80 microns in diameter, and forming a reacting mass by passing through such liquid mass, at atmospheric pressure, a stream of an oxygen-containing gas, said reaction mass being substantially anhydrous and free of added naturally occurring fatty material.

7. A process for the oxidation of normally solid paraffin hydrocarbons to form organic oxygen compounds, comprising the steps of maintaining said hydrocarbon at a temperature sufficient to convert the hydrocarbon to the liquid state but not substantially in excess of about 200° C., incorporating in the liquid mass thus formed a minor amount, not substantially in excess of about 2 per cent, of a drier metal salt of a carboxylic acid selected from the group consisting of long chain fatty acids having at least twelve carbon atoms and naphthenic acids soluble in said liquid mass and a catalytic amount of a manganese dioxide catalyst consisting of particles less than 80 microns in diameter, and forming a reacting mass by passing through such liquid mass, at atmospheric pressure, a stream of an oxygen-containing gas, said reaction mass being substantially anhydrous and free of added naturally occurring fatty material.

8. A process for the oxidation of normally solid paraffin hydrocarbons to form organic oxygen compounds, comprising the steps of maintaining said hydrocarbon at a temperature sufficient to convert the hydrocarbon to the liquid state but not substantially in excess of about 200° C., incorporating in the liquid mass thus formed a minor amount, not substantially in excess of about 2 per cent, of a drier metal salt of a carboxylic acid selected from the group consisting of long chain fatty acids having at least twelve carbon atoms and naphthenic acids soluble in said liquid mass and a catalytic amount of the organic-free inorganic product consisting of particles less than 80 microns in diameter produced by the reduction of potassium permanganate with an organic reducing agent, and forming a reacting mass by passing through such liquid mass, at atmospheric pressure, a stream of an oxygen-containing gas, said reaction mass being substantially anhydrous and free of added naturally occurring fatty material.

9. A process for the oxidation of a paraffin hydrocarbon of from 20 to 60 carbon atoms to form organic oxygen compounds, comprising the steps of maintaining said hydrocarbon at a temperature sufficient to convert the same to the liquid state but not substantially in excess of about 200° C., incorporating in the liquid mass thus formed a minor amount, not substantially in excess of about 2 per cent, of a drier metal salt of a carboxylic acid selected from the group consisting of long chain fatty acids having at least twelve carbon atoms and naphthenic acids soluble in said liquid mass and a catalytic amount of a manganese dioxide catalyst consisting of particles less than 80 microns in diameter, and forming a reacting mass by air blowing such liquid mass at atmospheric pressure, said reaction mass being substantially anhydrous and free of added naturally occurring fatty material.

10. A process for the oxidation of paraffin hydrocarbons of from 20 to 60 carbon atoms to form organic acids, comprising the steps of maintaining said hydrocarbon at a temperature sufficient to convert the hydrocarbon to the liquid state but not substantially in excess of about 200° C., incorporating in the liquid mass thus formed a minor amount, not substantially in excess of about 2 per cent, of zinc stearate and a catalytic amount of manganese dioxide catalyst consisting of particles less than 80 microns in diameter, and forming a reacting mass by air blowing such liquid mass, at atmospheric pressure, said reaction mass being substantially anhydrous and free of added naturally occurring fatty material.

11. A process for the oxidation of paraffin hydrocarbons of from 20 to 60 carbon atoms to form organic acids, comprising the steps of maintaining said hydrocarbon at a temperature sufficient to convert the hydrocarbon to the liquid state but not substantially in excess of about 200° C., incorporating in the liquid mass thus formed a minor amount, not substantially in excess of about 2 per cent, of a salt of a carboxylic acid selected from the group consisting of long chain fatty acids having at least twelve carbon atoms and naphthenic acids of a polyvalent metal other than manganese which salt is soluble in said liquid mass and a catalytic amount of manganese dioxide catalyst consisting of particles less than 80 microns in diameter, and forming a reacting mass by air blowing such liquid mass, at atmospheric pressure, said reaction mass being substantially anhydrous and free of added naturally occurring fatty material.

12. A process for the oxidation of normally solid paraffin hydrocarbons to form organic oxygen compounds, comprising the steps of maintaining said hydrocarbon at a temperature of 110–160° C. to convert the hydrocarbon to the liquid state, incorporating in the liquid mass thus formed a minor amount, not substantially in excess of about 2 per cent, of a polyvalent metal salt of a carboxylic acid selected from the group consisting of long chain fatty acids having at least twelve carbon atoms and naphthenic acids soluble in said liquid mass and a minor amount, not substantially in excess of about 0.5 per cent, of manganese dioxide, consisting of particles less than 80 microns in diameter, and forming a reacting mass by passing through such liquid mass, at atmospheric pressure, a stream of an oxygen-containing gas, said reaction mass being substantially anhydrous and free of added naturally occurring fatty material.

References Cited in the file of this patent

UNITED STATES PATENTS

| Number | Name | Date |
|---|---|---|
| 1,602,404 | Frazier | Oct. 2, 1926 |
| 2,216,222 | Beller et al. | Oct. 1, 1940 |
| 2,274,057 | Gerlicher | Feb. 24, 1942 |
| 2,323,861 | Zellner | July 6, 1943 |
| 2,391,236 | Hirsch | Dec. 18, 1945 |
| 2,486,454 | Zellner | Nov. 1, 1949 |

FOREIGN PATENTS

| Number | Country | Date |
|---|---|---|
| 386,715 | Great Britain | June 26, 1933 |
| 664,448 | Great Britain | Jan. 9, 1952 |